United States Patent [19]

Serikawa

[11] Patent Number: 4,701,041
[45] Date of Patent: Oct. 20, 1987

[54] FLASH PHOTOGRAPHING SYSTEM
[75] Inventor: Yoshio Serikawa, Tokyo, Japan
[73] Assignee: Ricoh Company, Ltd., Tokyo, Japan
[21] Appl. No.: 925,602
[22] Filed: Oct. 31, 1986
[30] Foreign Application Priority Data
  Oct. 31, 1985 [JP] Japan ................................ 60-242804
[51] Int. Cl.$^4$ ............................................. G03B 15/05
[52] U.S. Cl. .................................. 354/413; 354/145.1
[58] Field of Search ................................ 354/413–418, 354/127.1, 127.11, 127.12, 145.1

[56] References Cited
U.S. PATENT DOCUMENTS
  4,189,219  2/1980  Hasegawa et al. .................. 354/416

FOREIGN PATENT DOCUMENTS
  3503726  8/1985  Fed. Rep. of Germany ...... 354/416
  191023  10/1984  Japan ................................ 354/145.1

Primary Examiner—W. B. Perkey
Attorney, Agent, or Firm—Oblon, Fisher, Spivak, McClelland, & Maier

[57] ABSTRACT

A flash photographing system includes a camera unit having an ordinary camera structure for taking a picture and a flash unit having a flash lamp for flashing operation. The system includes a first signal line for transmitting a flash start signal from the camera unit to the flash unit and a second signal line for transmitting a flash unit side information signal from the flash unit to the camera unit. The camera unit includes a mixing circuit for mixing a timing signal with a camera side information signal to produce a composite timing signal which is transmitted via a third signal line to the flash unit which is provided with an interpreting circuit for interpreting the camera side information signal transmitted as a component of the composite timing signal.

10 Claims, 12 Drawing Figures

FLASH PHOTOGRAPHING SYSTEM

BACKGROUND OF THE INVENTION

1. Field of the Invention

This invention relates to a photographing system, such as a camera, and, in particular, to a flash photographing system including a camera unit and a flash unit.

2. Description of the Prior Art

A flash photographing system typically includes a camera unit and a flash unit. In order to carry out a flash photographing operation properly, it is necessary that a plurality of information signals can be communicated between the camera and flash units. One example of this will be described with reference to FIG. 12. As shown, in a typical prior art flash photographing system, the camera unit 1 is connected to the flash unit 2 through three kinds of signal lines $l_1$–$l_3$ by means of a hot shoe, a connection code, etc. The camera unit 1 is typically provided with first through third transmission terminals 1a, 1b and 1c, and the flash unit 2 is similarly provided with corresponding first through third transmission terminals 2a, 2b and 2c. Each of the three signal lines $l_1$–$l_3$ extends between the corresponding pair of transmission terminals between the camera unit 1 and the flash unit 2.

Figure 12:
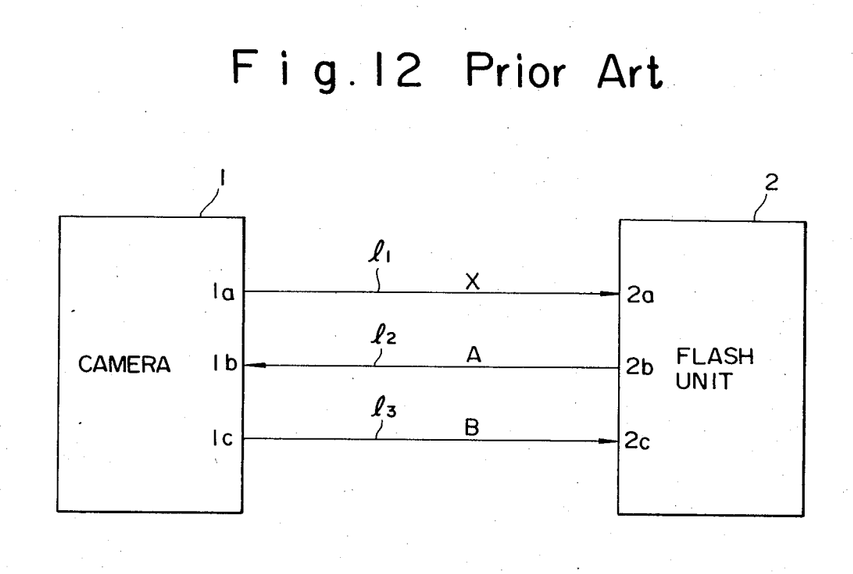
FIG. 12 is a block diagram showing the overall structure of a typical prior art flash photographing system.

For example, the first signal line $l_1$ extending between the first transmission terminal 1a of the camera unit 1 and the first transmission terminal 2a of the flash unit 2 is provided to carry a flash start signal X from the camera unit 1 to the flash unit 2. The pair of these first transmission terminals 1a and 2a is typically implemented in the form of a hot shoe which is fabricated according to industrial standards, such as Japanese Industrial Standards. A plurality of information signals A originating from the flash unit 2 are serially supplied from the flash unit 2 to the camera unit 1 through the second signal line $l_2$ extending from the second transmission terminal 2b of the flash unit 2 to the second transmission terminal 1b of the camera unit 1. In addition, a timing signal B is supplied from the camera unit 1 to the flash unit 2 through the third signal line $l_3$ extending from the third transmission terminal 1c of the camera unit 1 to the third transmission terminal 2c of the flash unit 2. The timing signal B is used to select the plurality of information signals A originating serially from the flash unit 2.

Typically, the flash start signal X is produced at the time when the shutter (not shown) provided in the camera unit 1 has been set fully open, and when this flash start signal X is supplied, the flash unit 2 initiates its flashing operation. The flash unit originating information signal A includes a maximum guide number possessed by the flash unit 2, a flash stop signal, an automatic light adjustment completion signal, a charging completion signal, etc. which are serially supplied from the flash unit 2 to the camera unit 1. The timing signal B is used to make selections for the various signals serially supplied from the flash unit 2 to the camera unit 1, so that, based on the timing signal B, desired signals from the flash unit 1 are supplied to the camera unit 1 as the flash unit originating information signal A. For further information in this respect, reference should be made to Japanese Patent Laid-open Publications, Nos. 59-189332, 59-191022 and 59-191023, which are hereby incorporated by reference.

Accordingly, various information signals are transmitted from the flash unit 2 to the camera unit 1 using the second and third transmission terminals 1b-2b and 1c-2c other than the first transmission terminals 1a and 2a, which are used to transmit the flash start signal X, so that the structure shown in FIG. 12 allows to carry out a flash photographing operation efficiently with the use of a minimum number of signal lines. However, in such a typical prior art flash photographing system, information to be supplied from the camera unit 1 to the flash unit 2, such as a set stop value in the case of an automatic flashing operation or automatic/manual setting information, cannot be transmitted. It is true that such information can be transmitted by providing additional signal lines and transmission terminals; however, the provision of such additional transmission terminals tends to make the entire system complicated in structure. In particular, in the case of the hot shoe type, the electrical connection between the camera unit 1 and the flash unit 2 tends to become unreliable, and attaching the flash unit 2 to the camera unit 1 becomes difficult. Besides, the exchangeability with other common flash units will be lost.

SUMMARY OF THE INVENTION

In accordance with the present invention, there is provided a flash photographing system including a camera unit and a flash unit, wherein the camera unit includes mixing means for mixing a timing signal with an information signal originating from the camera unit, thereby forming a composite signal to be supplied to the flash unit which includes separating means for separating the composite signal into the timing signal and the information signal originating from the camera unit. The flash unit also includes interpreting means connected to said separating means for interpreting the information signal originating from the camera unit. In the preferred embodiment of the present invention, the camera unit having a well-known camera structure is provided with a first terminal which is electrically connected to a first auxiliary terminal of the flash unit, wherein a flash start signal is transmitted from the camera unit to the flash unit through the first and first auxiliary terminals. The camera unit is also provided with a second terminal which is electrically connected to a second auxiliary terminal of the flash unit, wherein a plurality of information serially produced from the flash unit are transmitted to the camera unit through the second and second auxiliary terminals. The camera unit is also provided with a third terminal which is electrically connected to a third auxiliary terminal of the flash unit. The above-described composite signal is transmitted from the camera unit to the flash unit through the third and third auxiliary terminals.

It is therefore a primary object of the present invention to obviate the disadvantages of the prior art as described above and to provide an improved flash photographing system.

Another object of the present invention is to provide an improved flash photographing system capable of transmitting information between a camera unit and a flash unit at an increased rate without increasing the number of signal lines therebetween.

A further object of the present invention is to provide an improved flash photographing system capable of carrying out an optimal photographing operation at all times.

A still further object of the present invention is to provide an improved flash photographing system high in performance and simple in structure.

Other objects, advantages and novel features of the present invention will become apparent from the following detailed description of the invention when considered in conjunction with the accompanying drawings.

BRIEF DESCRIPTION OF THE INVENTION

DESCRIPTION OF THE PREFERRED EMBODIMENTS

Figure 1:
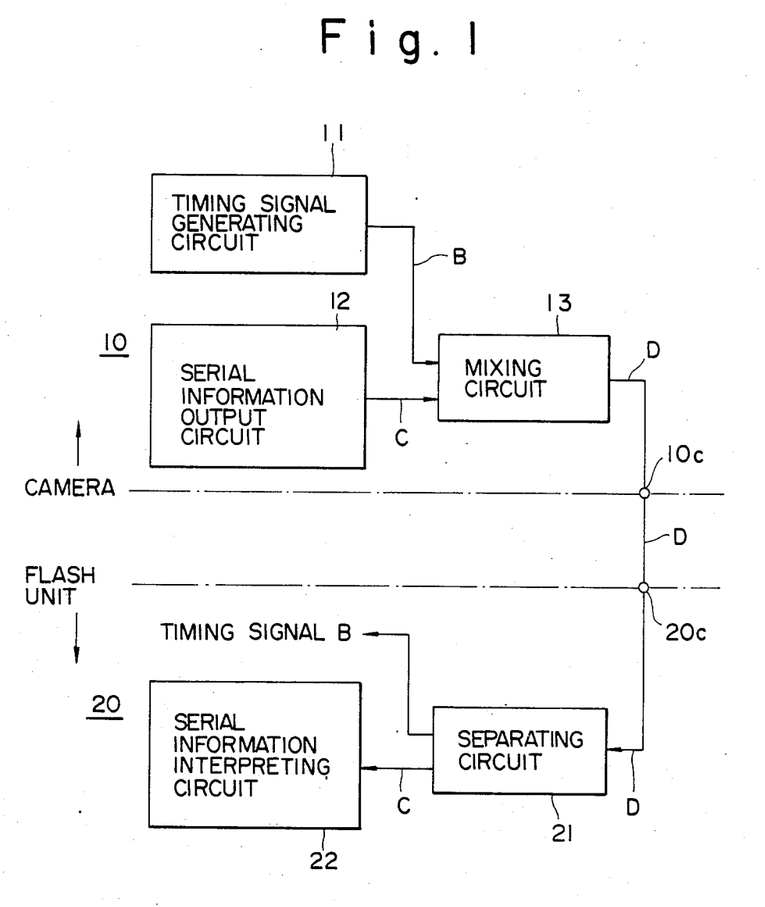
FIG. 1 is a block diagram schematically showing the overall structure of a flash photographing system of the present invention.

Referring now to FIG. 1, there is schematically shown in block form a flash photographing system constructed in accordance with the principle of the present invention. As shown, the flash photographing system generally includes a camera unit 10 and a flash unit 20. It should be understood that the camera unit 10 includes various elements constituting a structure which is necessary to carry out a photographing operation as well known in the art, though such elements are not shown for the sake of brevity. By the same token, although not shown specifically, the flash unit 20 also includes various elements, such as a flash lamp, which are generally required to carry out a flashing operation. In addition, although not shown specifically in FIG. 1, it is to be noted that the camera unit 10 and the flash unit 20 are connected by first and second signal lines with the first signal line carrying a flash start signal supplied from the camera unit 10 to the flash unit 20 and the second signal line carrying a plurality of serial data A originating from the flash unit 20 and supplied from the flash unit 20 to the camera unit 10 in a manner similar to the structure shown in FIG. 12.

As shown in FIG. 1, the camera unit 10 includes a timing signal generating circuit 11 which generates a timing signal B to be used for selecting data from the plurality of serial data produced by the flash unit 20. The timing signal generating circuit 11 has an output terminal which is connected to one input terminal of a mixing circuit 13 which has its other input terminal connected to receive a camera side information signal C comprised of a plurality of serial data produced by the camera unit 10 to be transmitted to the flash unit 20 from a serial information output circuit 12. These timing signal B and the camera side information signal C are combined by the mixing circuit 13 to produce a composite signal D which is supplied as an output of the mixing circuit 13. The composite signal D serves as another timing signal and it is transmitted from the camera unit 10 to the flash unit 20 through a third transmission terminal provided at the camera unit 10 and a third auxiliary transmission terminal provided at the flash unit 20 and electrically connected to the third transmission terminal 10c of the camera unit 10.

On the other hand, the flash unit 20 includes separating circuit 21 which is connected to receive the composite timing signal D supplied from the camera unit 10 and which separates the composite timing signal D into the original timing signal B and camera side information signal C. The separating circuit 21 has its one output terminal connected to supply the separated timing signal B which is used to select data from the flash unit side information signal A. The separating circuit 21 has its other output terminal connected to supply the separated camera side information signal C to a serial information interpreting circuit 22 which interprets the camera side information signal thus supplied to control the operation of the flash unit 20. Incidentally, the camera side information signal C includes various flashing information, such as a full illumination amount limit value in the case of ordinary automatic flash operation, a reference value of automatic flash operation in the case of TTL direct automatic flash operation, a guide number in the case of ordinary flash operation, an illumination amount correction value corresponding to a flash photographing mode, a power supply timer, the number of flash photographing operations, an illumination inhibit command, a flash light-emitting angle variation command and a flash light-emitting amount variation command.

Accordingly, in accordance with the principle of the present invention as described above, using three paired transmission terminals between the camera unit 10 and the flash unit 20, a flash photographing operation can be properly controlled based on not only the information supplied from the camera unit 10, but also the information supplied from the flash unit 20.

Now, the first embodiment of the present invention will be described in detail with reference to FIGS. 2 through 5. In this embodiment shown in FIG. 2, the camera unit 10 includes a timer 14, an inverter 15, AND gates 16 and 17, and an OR gate 18, which are connected as shown to define the mixing (or combining) circuit 13 shown in FIG. 1 for mixing the timing signal B and the camera side information signal C. Described more in detail, the timing signal B is supplied to an input terminal of the timer 14 and also to one input terminal of the AND gate 16 which has its other input terminal connected to an output terminal of the timer 14 through an inverter 15. After elapsing a time period $t_1$ from the rising of the timing signal B to Hi level at the input terminal of the timer 14, the output from the timer 14 is inverted to Hi level, and the output from the timer 14 returns to Lo level after elapsing a time period $t_1$ from the time when the timing signal B has fallen to Lo level. That is, an output signal supplied from the output terminal of the timer 14 is delayed from the timing signal B by the time period $t_1$.

Figure 2:
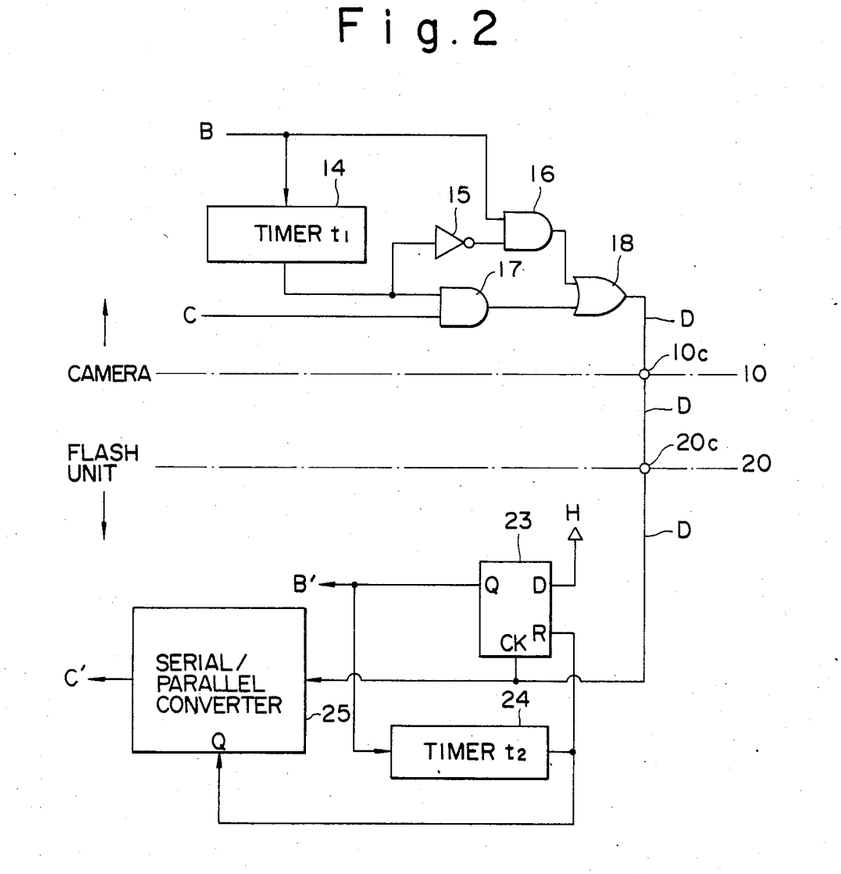
FIG. 2 is a schematic illustration showing in detail the first embodiment of the present invention.
Figure 3:
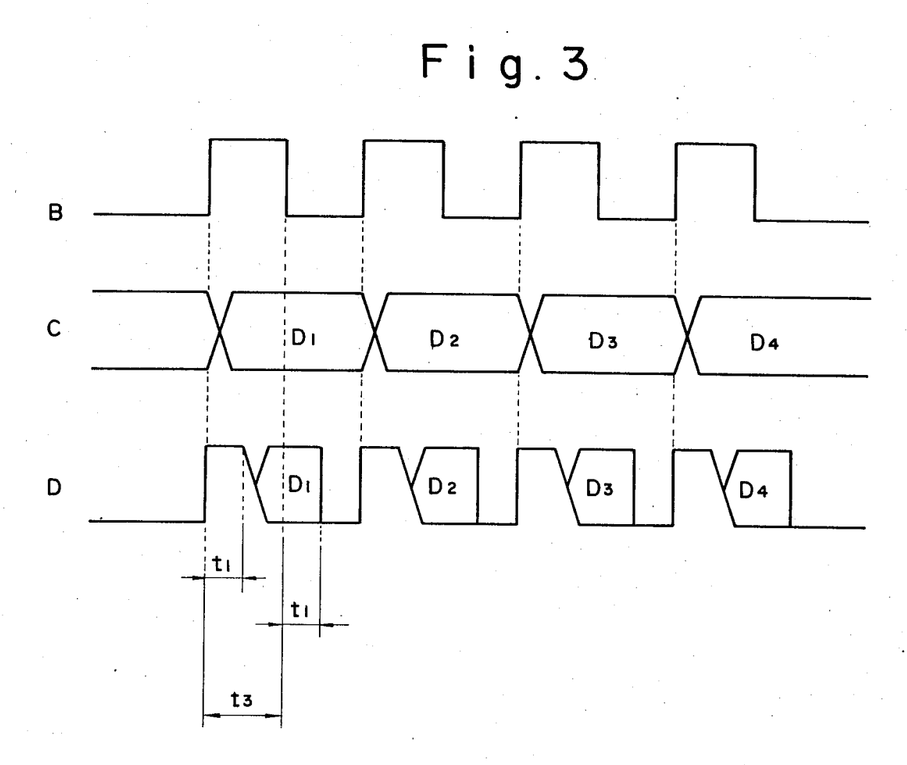
FIG. 3 is a timing chart which is useful for understanding the operation of the structure shown in FIG. 2.

The output terminal of the timer 14 is connected to one input terminal of the AND gate 17 which has its other input terminal connected to receive the camera side information signal C. This camera side information signal C includes a plurality of serial camera side data $D_1$ through $D_n$ which are supplied to the AND gate 17 in synchronism with the frequency of the timing signal B. The AND gates 16 and 17 have their output terminals connected to respective input terminals of the OR gate 18. The OR gate 18 has an output terminal, which defines an output terminal of the mixing circuit 13 and is connected to the third transmission terminal 10c of the camera unit 10, which, in turn, is electrically connected to the third auxiliary transmission terminal 20c of the flash unit 20.

On the other hand, the flash unit 20 of the flash photographing system shown in FIG. 2 includes a flip-flop 23, a timer 24 and a serial-to-parallel converter 25, which are connected as shown to define the separating circuit 21 and the serial interpreting circuit 22 shown in FIG. 1. For example, when the flash unit 20 is mounted on the camera unit 10, the terminals 10c and 20c are brought into electrical contact. The third auxiliary transmission terminal 20c provided in the flash unit 20 is connected to a serial input terminal of the serial-to-parallel converter 25 and also to a CK (clock) terminal of the D-type flip-flop 23 having a reset terminal The serial-to-parallel or S/P converter 25 has an output terminal which supplies the original camera side information signal C' separated from the composite timing signal D. The flip-flop 23 has a Q output terminal which is connected to an input terminal of the timer 24 having a delay time period $t_2$ which is set to be longer than the time period $t_1$ but shorter than a time period $t_3$. The timing signal B' separated from the composite timing signal D is output from the Q output terminal of the flip-flop 23. The timer 24 has its output terminal connected to a reset (R) terminal of the flip-flop 23 and also to a read control input terminal of the S/P converter 25. When a Hi level is applied to the read control input terminal, the S/P converter 25 allows to read in a serial input signal; whereas, when a Lo level is applied, reading is inhibited. The flip-flop 23 also has a data (D) input terminal, to which a Hi level voltage is supplied.

The operation of the flash photographing system having the mixing and interpreting circuits as described above will be explained below. In the first place, the mixing or combining operation of the timing signal D to be transmitted from the camera unit 10 to the flash unit 20 will be described with reference to the flow chart shown in FIG. 4.

Figure 4:
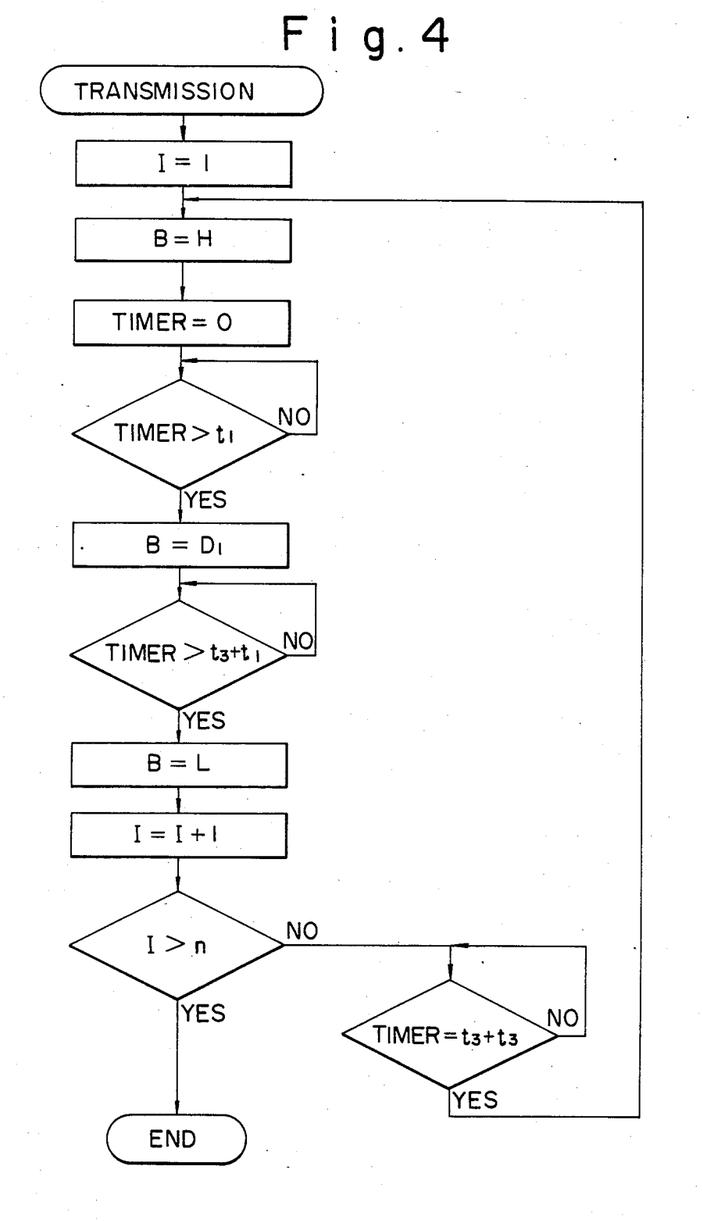
FIGS. 4 and 5 are flow charts which are also useful for understanding the operation of the structure shown in FIG. 2.

Along with rising of the timing signal B to Hi level, when a first (I=1) data $D_1$ of the camera side information signal is supplied, the timer 14 is activated, and, at the same time, the AND gate 16 is set open. Under this condition, since a Lo level output supplied from the timer 14 is inverted by the inverter 15 to a Hi level signal which is then supplied to the remaining input signal of the AND gate 16, an output signal from the AND gate 16 is at Hi level. This Hi level output signal from the AND gate 16 is passed through the OR gate 18 to form a timing signal component of the composite timing signal D to be supplied to the flash unit 20. This condition continues as long as the output signal from the timer 14 is at Lo level, i.e., during the time period $t_1$ from the time when the timing signal B has risen to Hi level.

When the time period $t_1$ has elapsed from the rising of the timing signal B to Hi level, the output signal from the timer 14 is inverted to Hi level. Then, this Hi level signal is inverted to a Lo level signal by the inverter 15 and the inverted Lo level signal is applied to the one input terminal of the AND gate 16 to have it closed. As a result, under this condition, the timing signal B is not supplied to form part of the composite timing signal D. At the same time, the Hi output signal from the timer 14 causes the AND gate 17 to be set open, so that the first data D1 of the camera side information signal C passes through the AND gate 17 and also the OR gate 18 to form part of the composite timing signal D to be transmitted to the flash unit 20.

This condition continues until the output from the timer 14 changes to Lo level, i.e., during a time period which is equal to a sum of the pulse time period $t_3$ and the time period $t_1$ of the timer 14 from the time when the timing signal B has risen to Hi level. When the output from the timer 14 changes to Lo level, the AND gate 17 is set closed, and, at the same time, the AND gate 16 is set open. For this reason, the timing signal D is maintained at Lo level until the timing signal B rises to Hi level. Thereafter, when the timing signal B rises to Hi level at the end of the first period of the timing signal B, the timing signal B and the second data D2 of the camera side information signal C are combined in a manner similar to that described above.

Similarly, the third through nth (I) data D3 through Dn of the camera side information signal C are sequentially combined with the timing signal B to form the composite timing signal D, which is then transmitted to the flash unit 20. When the nth (I) data Dn has been combined into the composite timing signal D and transmitted to the flash unit 20, the transmission of a series of camera side information to the flash unit 20 is completed.

Figure 5:
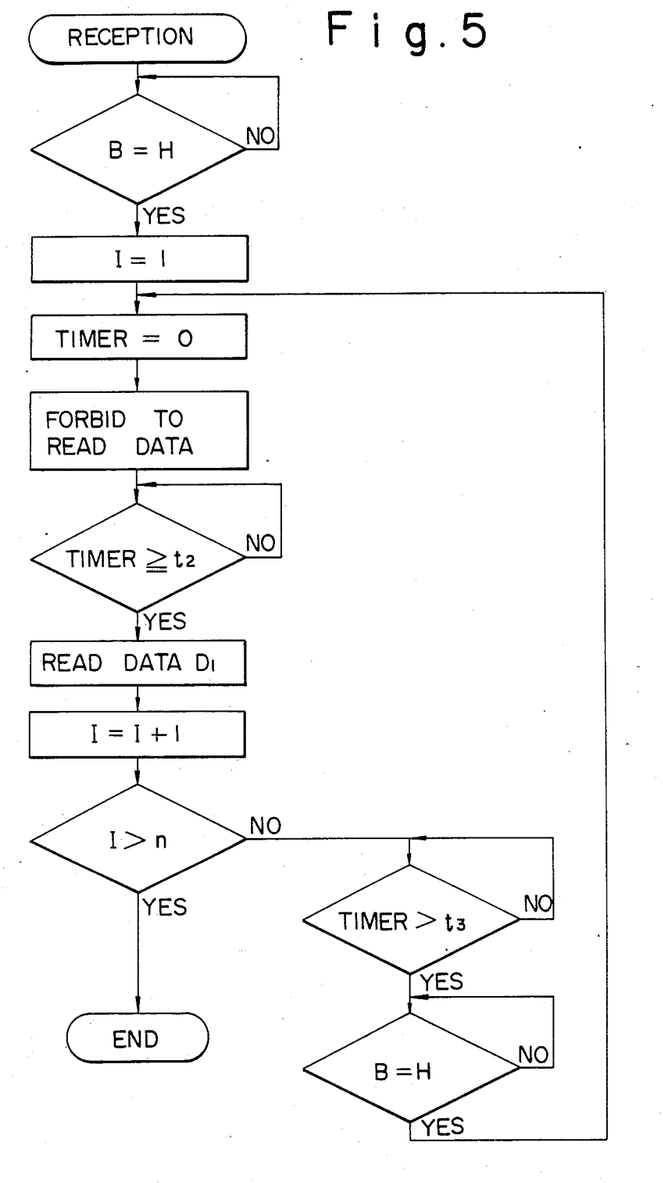

Now, the interpreting operation of the composite timing signal D at the side of the flash unit 20 will be described with particular reference to the flow chart shown in FIG. 5. As described previously, in one example, when the flash unit 20 is mounted at a predetermined position of the camera unit 10, the transmission terminals 10c and 20c are brought into electrical contact, thereby allowing the composite timing signal D produced at the side of the camera unit 10 to be transmitted to the flash unit 20. The composite timing signal D thus received at the flash unit 20 is supplied to the CK terminal of the flip-flop 23 and also to the input terminal of the S/P converter 25. Since the Hi level voltage is normally applied to the D input terminal of the flip-flop 23, when the composite timing signal D rising to Hi level is applied to the CK input terminal of the flip-flop 23, the output signal at the Q output terminal is inverted to Hi level. Simultaneously therewith, the timer 24 is activated. Under this condition, since the output from the timer 24 is at Lo level, the read-in operation of a serial input signal is inhibited at the S/P converter 25, so that there is maintained a condition in which no camera side information signal C', or a component to be separated from the composite timing signal D, is output.

After elapsing the time period $t_2$, the output of the timer 24 changes to Hi level, which causes the input signal to the R input terminal of the flip-flop 23 to become Hi level, thereby causing the flip-flop 23 to be reset, and, at the same time, allowing to read in a serial input signal at the S/P converter 25. Thus, at the same time when the separated timing signal B' changes to Lo level, the composite timing signal D is read into the S/P converter 25 and a camera side information signal C' separated from the composite timing signal D and corresponding to the camera side information signal C is output from the S/P converter 25. In this manner, each time when the timing signal B and the camera side information signal C are combined into the composite timing signal D at the camera unit 10 and transmitted to the flash unit 20, the composite timing signal D is separated into the timing signal B' corresponding to the original timing signal B produced in the camera unit 10 and the camera side information signal C' corresponding to the original camera side information signal C produced in the camera unit 10. This operation is repeated until the nth data Dn is transmitted to the flash unit 20 in the form of the composite timing signal D.

Figure 6:
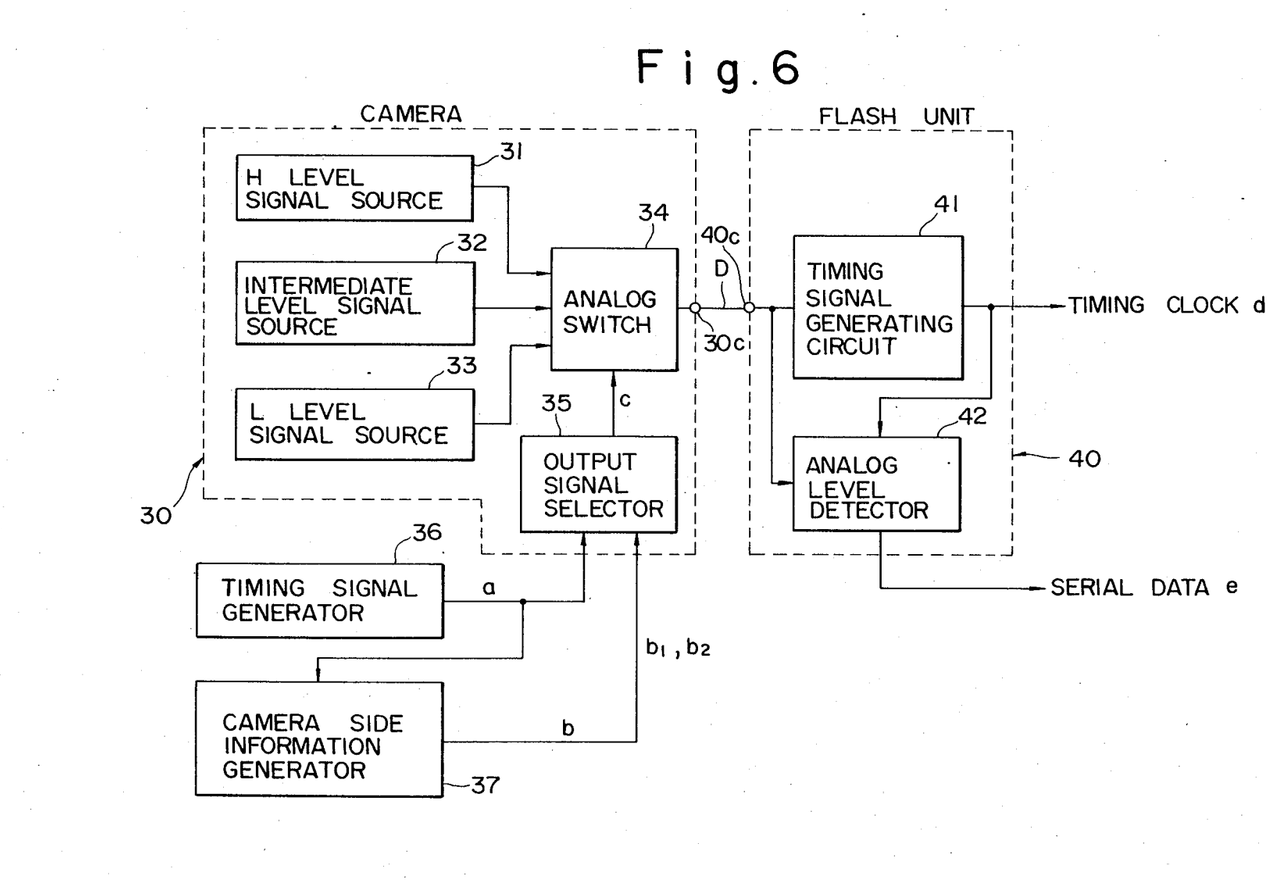
FIG. 6 is a schematic illustration showing in detail the second embodiment of the present invention.
Figure 7:
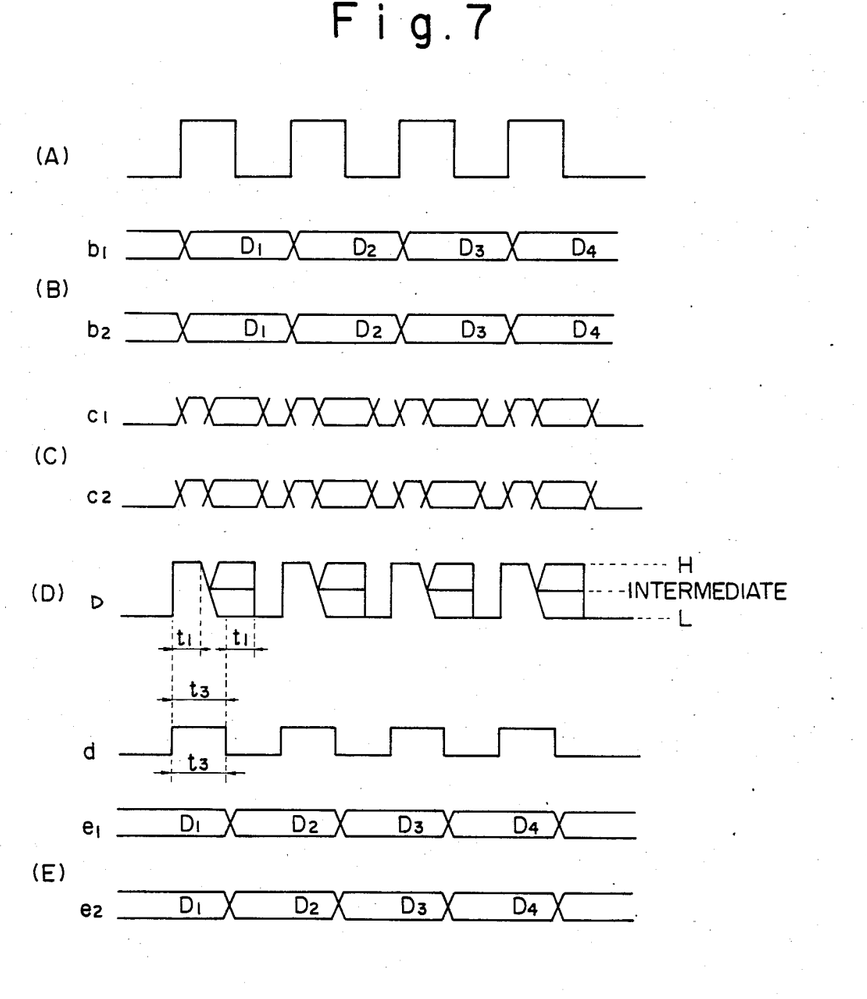
FIG. 7 is a timing chart which is useful for understanding the operation of the structure shown in FIG. 6.
Figure 8:
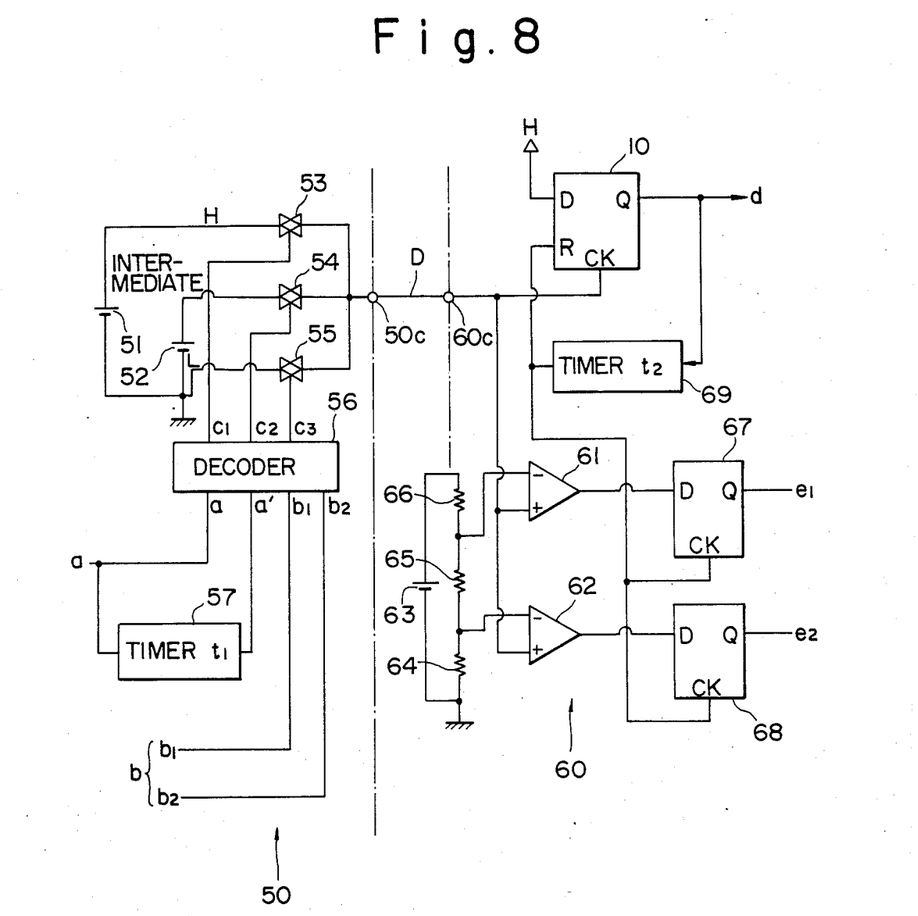
FIG. 8 is a schematic illustration showing further in detail a specific example of the second embodiment shown in FIG. 6.

Referring now to FIGS. 6 through 8, the second embodiment of the present invention will be described in detail. In the above-described first embodiment, the data D1 through Dn of the camera side information signal C are generated as Hi or Lo level signals, so that the time required for transmitting the data from the camera unit to the flash unit tends to be longer. This second embodiment has a structure which allows to carry out data transmission efficiently.

Referring to FIG. 6, the flash photographing system constructed in accordance with the second embodiment of the present invention generally includes a camera unit 30, a flash unit 40, a timing signal generating circuit 36 and a camera side information generating circuit 37. It is to be noted that although the elements 36 and 37 are shown to be separate from the camera unit 30 in the illustrated embodiment, they may be provided as incorporated in the camera unit 30. As shown, the camera unit 30 includes mixing or combining means for mixing or combining a timing signal from the timing signal generating circuit 36 and a camera side information signal from the camera side information generating circuit 37. In the illustrated embodiment, the camera unit 30 is provided with a Hi level signal source 31 for supplying a high level signal, a Lo level signal source 33 for supplying low level signal and an intermediate level signal source 32 for supplying an intermediate level signal having a level between the high and low levels. Each of these three signal sources 31, 32 and 33 is connected to the corresponding one of three input terminals of an analog switch 34 which has its control input terminal connected to a control output terminal of an output signal selector circuit 35.

As briefly described before, the timing signal generating circuit 36 and the camera side information generating circuit 37 are provided as connected to the output signal selector circuit 35. The timing signal generating circuit 36 has a function of making a selection regarding a plurality of flash unit side information signals produced serially from the flash unit 40, and the camera side information signal generating circuit 37 has a function of generating a camera side information signal to be supplied serially from the camera unit 30 to the flash unit 40. A timing signal a generated at the output terminal of the timing signal generating circuit 36 is supplied to one input terminal of the output signal selector circuit 35, and a camera side information signal b comprised of 2 bits b1 and b2 generated at the output terminal of the camera side information signal generating circuit 37 is supplied to the other input terminal of the output signal selector circuit 35. On the other hand, the flash unit 40 includes a timing signal generating circuit 41 which has its output terminal connected to a control terminal of an analog level detector 42 which is also provided in the flash unit 40.

The output terminal of the analog switch 34 defines the output terminal of the mixing circuit and is connected to a third transmission terminal 30c of the camera unit 30, which, in turn, is electrically connected to a third auxiliary transmission terminal 40c of the flash unit 40. Thus, a composite timing signal outputting from the analog switch 34 may be transmitted to the flash unit 40 through the terminals 30c and 40c which are electrically connected. In one example, when the flash unit 40 is mounted on the camera unit 30 at a predetermined position thereof, the terminals 30c and 40c are brought into electrical connection. The transmission terminal 40c of the flash unit 40 is connected to an input terminal of each of the timing generating circuit 41 and the analog level detector 42. From the output terminal of the timing signal generating circuit 41 is output a timing clock signal d as separated from the composite timing signal D, and a 2-bit serial data e comprised of e1 and e2 is output from the output terminal of the analog level detector 42 as separated from the composite timing signal D.

One specific example of the second embodiment shown in FIG. 6 is shown in FIG. 8 in more detail. As shown in FIG. 8, there are provided three analog switches 53, 54 and 55 with the switch 53 having its input end connected to a first power supply 51 supplying a Hi level signal, the switch 54 having its input end connected to a second power supply 52 supplying an intermediate level signal and the switch 55 having its input end connected to a Lo or ground level signal. The switches 53 through 55 have their output ends commonly connected to the transmission terminal 50c of the camera unit 50. In addition, each of the three switches 53 through 55 has a control terminal which is connected to the corresponding one of 3-bit output terminals c1 through c3 of a decoder 56 which corresponds to the output signal selector circuit 35 shown in FIG. 6. The relation between the Hi and Lo conditions of these three bits c1 through c3 and the composite timing signal D is shown in table 1 below.

TABLE 1

| c1 | c2 | c3 | Timing Signal D |
|----|----|----|-----------------|
| Lo | Lo | Hi | Lo level |
| Lo | Hi | Lo | Intermediate level |
| Hi | Lo | Lo | Hi level |

The decoder 56 receives the timing signal a and the 2-bit camera side information signal b1 and b2. The relation among the Hi and Lo conditions of these camera side information signal bits b1 and b2, the Hi and Lo conditions of the above-described output signals c1 through c3, and the timing signal D is shown in table 2 below.

TABLE 2

| c1 | c2 | c3 | b1 | b2 | Timing Signal D |
|----|----|----|----|----|-----------------|
| Lo | Lo | Hi | Lo | Lo | Lo level |
| Lo | Hi | Lo | Lo | Hi | Intermediate level |
| Hi | Lo | Lo | Hi | Hi | Hi level |

The timer 56 also receives a delayed timing signal a' which is produced from the timing signal a through the timer 57. It is to be noted that the timer 57 has the set time period t₁ similarly as the above-described first embodiment.

On the other hand, the flash unit 60 includes flip-flops 67, 68 and 70, operation amplifiers 61 and 62, a timer 69, etc., which define the interpreting means. The flash unit 60 is provided with a third auxiliary transmission terminal 60c which is in electrical connection with the third transmission terminal 50c of the camera unit 50 and which is connected to a CK (clock) terminal of the D-type flip-flop 70 having a reset terminal and also to a non-inverting input terminal of each of the operational amplifiers 61 and 62. A reference power supply 63 for identifying either one of the above-described high, intermediate and low levels is provided in the flash unit 60. The voltage from the reference power supply 63 is applied to both ends of serially connected resistors 64 through 65, which define a voltage divider. A node between the resistors 64 and 65 defines an upper limit reference value for the intermediate level and is connected to an inverting input terminal of the operational amplifier 62. On the other hand, a node between the resistors 65 and 66 defines an upper limit reference value for the Hi level and is connected to an inverting input terminal of the operational amplifier 61.

With this structure, if the composite timing signal D supplied to the non-inverting input terminal of each of the operational amplifiers 61 and 62 is at Hi level, both of the operational amplifiers 61 and 62 supply Hi level output signals. On the other hand, if the composite timing signal D is at intermediate level, then only the operational amplifier 62 supplies a Hi level output signal. If the composite timing signal D is at Lo level, then both of the operational amplifiers 61 and 62 supply Lo level output signals. These operational amplifiers 61 and 62 have their output terminals connected to respective D (data) input terminals of the D-type flip-flops 67 and 68, whose CK (clock) input terminals are commonly connected to the output terminal of the timer 69 and also to the R (reset) input terminal of the flip-flop 70. The timer 69 has its input terminal connected from the Q output terminal of the flip-flop 70, and the timing signal d separated from the composite timing signal D is obtained from the Q output terminal of the flip-flop 70. On the other hand, the flip-flops 67 and 68 have Q output terminals, from which the camera side information signal bits e1 and e2 separated from the composite timing signal D are obtained. The Hi and Lo conditions of these camera side information signal bits e1 and e2 depend on the condition of the composite timing signal D as shown in table 3 below.

TABLE 3

| Timing Signal D | e1 | e2 |
|---|---|---|
| Lo level | Lo | Lo |
| Intermediate level | Lo | Hi |
| Hi level | Hi | Hi |

Now, the operation of the present flash photographing system including the mixing and interpreting means as described above will be described. In the first place, the operation for forming the composite timing signal D to be transmitted from the camera unit 50 to the flash unit 60 will be described with particular reference to the timing chart shown in FIG. 7.

Along with rising of the timing signal a to Hi level, when the first data D1 represented by the camera side information signal bits b1 and b2 (b) is supplied, the timer 57 is activated, and, at the same time, the camera side information signals b1 and b2 are input into the decoder 56. At this time, since the output signal from the timer 57 is at Lo level, only the output signal c1 among the three output signals c1 through c3 is at Hi level, so that, as shown in the table 1, the composite timing signal D becomes Hi level and is supplied to the flash unit 60. This condition holds while the output signal from the timer 57 is at Lo level, i.e., during a time period until the time period t1 elapses from the time when the timing signal a has risen to Hi level. After elapsing the time period t1, the output signal a' from the timer 57 becomes Hi level. Thus, depending on the conditions of the camera side information signals b1 and b2, the conditions of the output signals c1 through c3 of the decoder 56 are determined as shown in table 2, so that the level of the composite timing signal D comes to correspond to the conditions of the camera side information signals b1 and b2.

In this manner, the first data D1 of the camera side information signal is transmitted to the flash unit 60 as part of the composite timing signal D. This condition holds until the output signal from the timer 57 changes to Lo level, i.e., during a time period which is a sum of the pulse time period t3 and the setting time period t1 of the timer 57 from the time when the timing signal a has risen to Hi level. And, then, when the output signal from the timer 57 changes to Lo level, the timing signal D is maintained at Lo level until the timing signal a is again changed to Hi level. Thereafter, when the timing signal a changes to Hi level at the end of the first period of the timing signal a, the timing signal a and the second data D2 of the camera side information signals b1 and b2 are mixed in a similar manner. Similarly, the third through nth data D3 through Dn are sequentially mixed with the timing singal a into the composite timing singal D of Hi, intermediate or Lo level and transmitted to the flash unit 60. After mixing the nth data Dn with the timing singal a into the composite timing signal D and transmitting it to the flash unit 60, the transmission of a series of camera side information is completed.

Next, the interpreting operation of the composite timing signal D at the flash unit 60 will be described. Since the third auxiliary transmission terminal 60c is electrically connected to the third transmission terminal 50c of the camera unit 50, for example by mounting the flash unit 60 on the camera unit 50 at a predetermined position thereof, the composite timing signal D supplied from the camera unit 50 is transmitted to the flash unit 60. The composite timing signal D thus transmitted is supplied to the CK terminal of the flip-flop 70 and also to the non-inverting input terminal of each of the operational amplifiers 61 and 62. Since a Hi level voltage is normally applied to the D input terminal of the flip-flop 70, when the timing signal D supplied to the CK input terminal of the flip-flop 70 becomes Hi level, an output signal from the Q output terminal is inverted to Hi level. At the same time, the timer 69 is activated. Under this condition, since the output signal from the timer 69 is at Lo level, this Lo level output signal is input to the CK input terminal of each of the flip-flops 67 and 68.

As a result, the camera side information signals e1 and e2 are maintained at the condition of supplying no camera side information component. And, after elapsing the time period t2, the output signal of the timer 69 rises to Hi level, so that the signal at the R input terminal of the flip-flop 70 becomes Hi level, thereby causing the flip-flop 70 to be reset, and, at the same time, allowing to obtain the camera side information signals e1 and e2 depending on which one of Hi, intermediate and Lo levels the composite timing signal D has, as shown in the table 3. Thus, simultaneously with the timing signal d separated from the composite timing signal D being inverted to Lo level, the first data D1 contained in the composite timing signal D is output as the camera side information signals e1 and e2.

Similarly, thereafter, each time when the composite timing signal D including a timing signal component and a camera side information signal component is formed and transmitted from the camera unit 50 to the flash unit 60, the timing signal component and the camera side information signal component are taken out with three different conditions of Hi, intermediate and Lo levels. And, this operation is repeated until the nth data Dn is transmitted as contained in the composite timing signal D.

As described above, in accordance with this embodiment, information of three kinds of Hi, intermediate and Lo levels can be transmitted using a 2-bit information signal, so that the data transmission efficiency is enhanced.

Figure 10:
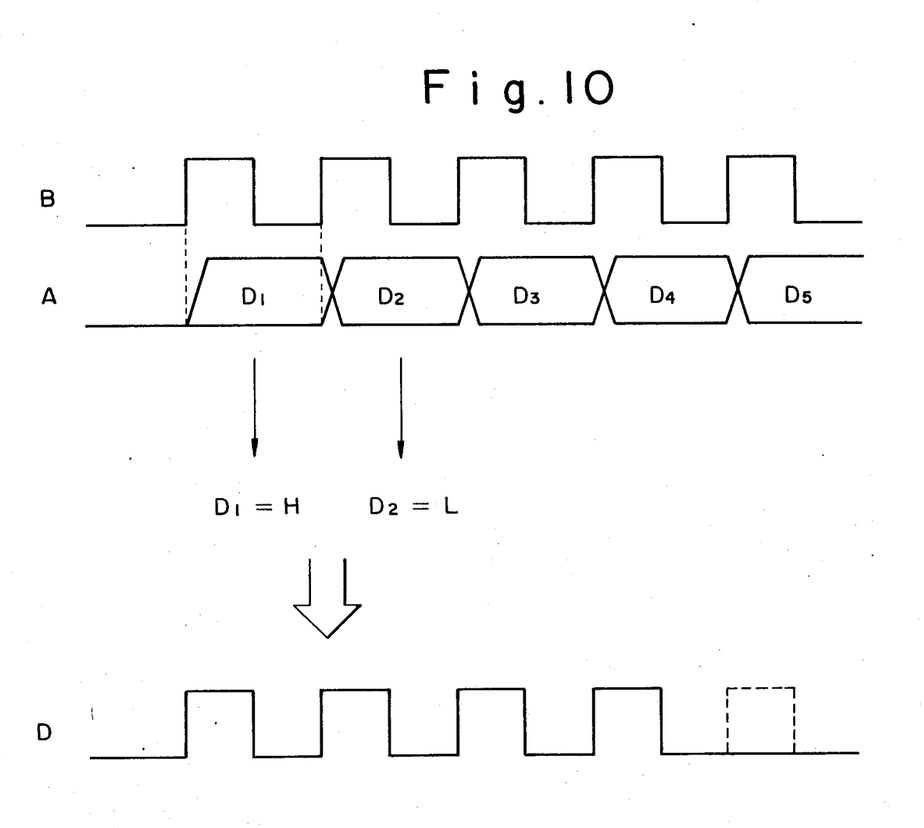
FIG. 10 is a timing chart which is useful for understanding the operation of the structure shown in FIG. 9.
Figure 11:
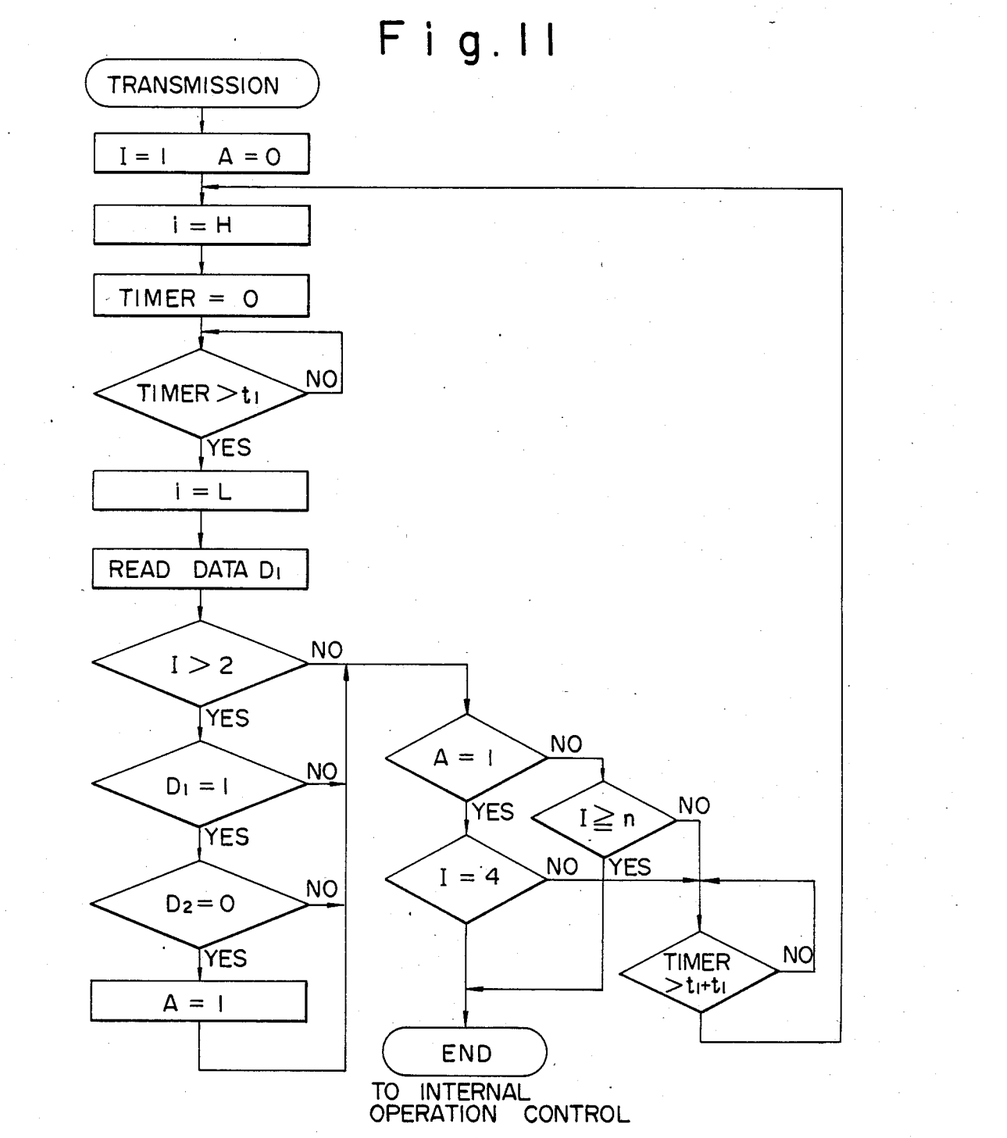
FIG. 11 is a flow chart which is useful for understanding the operation of the structure shown in FIG. 9.

Now, the third embodiment of the present invention will be described with particular reference to FIGS. 9 through 11. In the above-described first and second embodiments, the transmission of information between the camera unit and the flash unit is bidirectional, so that information is transmitted not only from the camera unit to the flash unit, but also from the flash unit to the camera unit. Thus, the flash unit must be made to be exclusive use for the camera unit. However, in the case of flash photographing operation, there is a case in which it is desired to use an ordinary flash unit having the function of transmitting information only from the flash unit to the camera unit instead of the exclusively made flash unit. In such a case, the flash photographing operation may not be carried out properly. The third embodiment of the present invention is structured to cope with such a situation.

Figure 9:
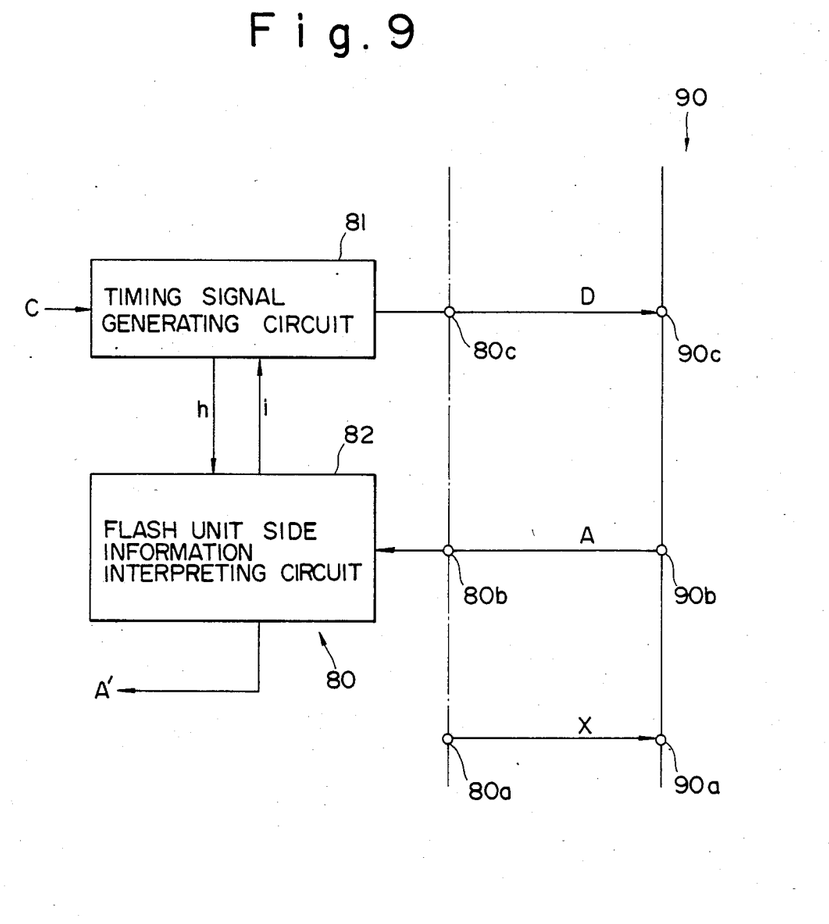
FIG. 9 is a schematic illustration showing in detail the third embodiment of the present invention.

As shown in FIG. 9, the flash photographing system of this embodiment also includes a camera unit 80 and a flash unit 90. A first signal line is established between the camera and flash units 80 and 90 through a first transmission terminal 80a and a first auxiliary transmission terminal 90a for transmitting the flash start signal X from the camera unit 80 to the flash unit 90. A second signal line is also established between the camera and flash units 80 and 90 through a second transmission terminal 80b and a second auxiliary transmission terminal 90b for transmitting the flash unit side information signal A, including a plurality of serial data, from the flash unit 90 to the camera unit 80. The camera unit 80 is provided with a timing signal generating circuit 81 for generating the composite timing signal D which is used for selecting data from the flash unit side information signal A. The timing signal generating circuit 81 has an input terminal for receiving a camera side information signal C which contains various data to be supplied from the camera unit 80 to the flash unit 90 serially. The timing signal generating circuit 81 has an output terminal from which the composite timing singal D is transmitted from the camera unit 80 to the flash unit 90 through the paired third transmission terminals 80c and 90c.

The second transmission terminal 80b, to which the flash unit side information signal A is transmitted from the flash unit 90, is connected to the input terminal of a flash unit side information signal interpreting circuit 82. An interpreted flash unit side information signal A' is output from the output terminal of the interpreting circuit 82 for use in various photographic control operations. A control signal h is supplied from the timing signal generating circuit 81 to the interpreting circuit 82 so that the timing of the interpreting operation is properly controlled. In addition, an inhibit signal i is supplied from the interpreting circuit 82 to the timing signal generating circuit 81, whereby the camera side information signal C is prevented from forming a component of the composite timing signal D.

On the other hand, although not shown in FIG. 9, it is to be noted that the flash unit 90 is provided with a separating circuit (not shown) for separating the composite timing signal D into the timing signal and the camera side information signal. The timing signal thus separated is obtained at one output terminal (not shown) of the separating circuit (not shown) and it is used to select data from the flash unit side information signal A. Moreover, the camera side information signal C thus separated is obtained at the other output terminal (not shown) of the separating circuit (not shown) and the operation of the flash unit 90 is properly controlled based on this signal.

In a manner similarly as described before, as the camera side information signal C, a plurality (n) of flash operation information, such as a full illumination amount limit value in the case of an ordinary automatic flashing operation, an automatic flash reference value in the case of TTL direct automatic flashing operation, and a guide number in the case of an ordinary flashing operation, are transmitted from the camera unit 80 to the flash unit 90 through the third signal line extending between the paired third transmission terminals 80c and 90c. However, it is assumed that the flash unit 90 is structured to receive, for example, only four kinds of signals less than the n plurality and to possess a function of controlling the flash unit only.

Now, the operation of the flash photographing system of the present invention will be described with particular reference to FIGS. 10 through 11. Similarly as described above, the composite timing signal D transmitted from the camera unit 80 to the flash unit 90 through the paired third transmission terminals 80c and 90c contains components of the camera side information signal C and the timing signal B mixed by the timing signal generating circuit 81. On the other hand, the flash unit side information signal A transmitted from the flash unit 90 to the camera unit 80 through the paired second transmission terminals 90b and 80b is interpreted by the flash unit side information signal interpreting circuit 82. The timing of interpretation is determined based on the control signal h supplied from the timing signal generating circuit 81. That is, in the case where it is so set at the flash unit 90 that the data D1 and D2 of the flash unit side information signal A are at Hi and Lo levels, respectively, then the discrimination of this setting will be carried out by the interpreting circuit 82.

Then, the inhibit signal i is supplied to the timing signal generating circuit 81 and thus the supply of the camera side information signal C as a component of the composite timing signal D is terminated after four pulses. Thus, in the case where the flash unit 90 is equipped with the function of only transmitting information from the camera unit 80 to the flash unit 90, the number of output pulses (four pulses in the present example) of the composite timing signal can be varied corresponding to the kind of the flash unit 90 in use, and, as a result, the versatility in using the camera unit 80 in flash photographing operation can be enhanced.

While the above provides a full and complete disclosure of the preferred embodiments of the present invention, various modifications, alternate constructions and equivalents may be employed without departing from the true spirit and scope of the invention. For example, the format of the data contained in the flash unit side information signal A, the pulse arrangement format of the timing signal B, the format of the data contained in the camera side information signal C, and the arrangement format of timing signal and camera side information signal components in the composite timing signal D may be designed arbitrarily. Therefore, the above description and illustration should not be construed as limiting the scope of the invention, which is defined by the appended claims.

What is claimed is:

1. A flash photographing system comprising:
   a camera unit including mixing means for mixing a timing signal with a camera side information signal to produce a composite timing signal;
   a flash unit including interpreting means for interpreting said camera side information signal;
   first means for transmitting a first signal from said camera unit to said flash unit;
   second means for transmitting a second signal from said flash unit to said camera unit; and
   third means for transmitting said composite signal from said camera unit to said flash unit.

2. The system of claim 1 wherein said first means includes a pair of first transmission terminals each provided at each of said camera and flash units, said pair of first transmission terminals being electrically connected.

3. The system of claim 2 wherein said first signal is a flash start signal.

4. The system of claim 1 wherein said second means includes a pair of second transmission terminals each provided at each of said camera and flash units, said pair of second transmission terminals being electrically connected.

5. The system of claim 4 wherein said second signal is a flash unit side information signal containing a plurality of data produced serially at the flash unit.

6. The system of claim 1 wherein said third means includes a pair of third transmission terminals each provided at each of said camera and flash units, said pair of third transmission terminals being electrically connected.

7. The system of claim 1 wherein said mixing means mixes said composite timing signal with one of a plurality of analog voltage level signals and said interpreting means includes an analog voltage level detector for detecting the voltage level of said composite timing signal transmitted from said camera unit.

8. The system of claim 7 wherein said camera unit includes a plurality of voltage sources and an analog switch device for mixing the voltage signals supplied from said plurality of voltage sources selectively with said composite timing signal.

9. The system of claim 1 wherein said camera unit includes controlling means responsive to said second signal transmitted from said flash unit for controlling a duration of said composite timing pulse to be transmitted from said camera unit to said flash unit.

10. The system of claim 9 wherein said duration is controlled by limiting the number of pulses to be transmitted from the camera unit to said flash unit as said composite timing pulse.

* * * * *